April 3, 1951 D. E. NOBLE 2,547,024

SELECTIVE CALLING SYSTEM

Filed July 2, 1947 3 Sheets-Sheet 1

*INVENTOR.*
Daniel E. Noble

*BY*
Foorman L. Mueller
Attorney

*INVENTOR.*
Daniel E. Noble
*BY*
Foorman L. Mueller
Attorney

April 3, 1951 D. E. NOBLE 2,547,024

SELECTIVE CALLING SYSTEM

Filed July 2, 1947 3 Sheets-Sheet 3

INVENTOR.
Daniel E. Noble

BY
Foorman L. Mueller

Attorney

Patented Apr. 3, 1951

2,547,024

UNITED STATES PATENT OFFICE 2,547,024

SELECTIVE CALLING SYSTEM

Daniel E. Noble, Elmhurst, Ill., assignor to Motorola, Inc., Chicago, Ill., a corporation of Illinois Application July 2, 1947, Serial No. 758,496

9 Claims. (Cl. 250—6)

This invention relates generally to systems for providing selective calling or selective switching in radio or wire communication equipment and in particular to a system in which the calling signals and communication signals are transmitted over a single channel.

In radio communication networks such as used by police, or in any other installations including a central station and a plurality of remote stations, it is necessary that some signal system be provided so that an operator at the central station can call an operator at a remote station or perform a selective switching operation on remote equipment. Such systems may provide an audible or visual signal to notify the called operator, or preferably may be connected into the remote radio stations in such a way that the signal will automatically condition the receiver at a particular remote station for operation. These systems may also be used to provide some other switching function such as to turn on standby units.

Prior systems provided for this purpose have been patterned after selective calling equipment used in telephone systems with the result that the equipment has been relatively complicated and consequently expensive. Also in many radio communication systems as above described the remote stations are mobile units and the equipment therefor must be rugged in order to provide dependable service when subject to vibration and shock encountered in a vehicular installation. The prior selective calling equipment being complicated is not well adapted to vehicular use and also requires a relatively large amount of space which is not generally available in such vehicular installations.

In order to provide a selective calling system utilizing a minimum of equipment, the system should be such that the calling signals can be transmitted over the usual communication channel. Further, the system should be flexible so that it is capable of providing the number of different calls required in a more complex system and still provide a relatively simple system for use where a relatively small number of calls is required.

It is, therefore, an object of the present invention to provide an improved selective calling system for radio communication networks which is of rugged construction.

It is another object of this invention to provide a selective calling system for a radio communication network in which the calling signals and the voice signals are transmitted over a single channel and which discriminates between the calling signals and the voice signals.

A further object of this invention is to provide a comparatively simple and inexpensive calling system which is particularly applicable to frequency modulation radio communication networks.

A feature of this invention is the provision of a selective calling system which derives the energy required for operation thereof from a tone of a particular frequency.

A further feature of this invention is the provision of a selective calling system adapted to be operated by a pair of calling signals one of which acts as a carrier for the other signal.

A still further feature of this invention is the provision of a selective responsive device including an electromechanical contactor responsive to a particular frequency and means for energizing said device from a tone of a different particular frequency so that the device responds to operate controls upon simultaneous actuation of said contactor and application of energy thereto.

Further objects, features and advantages will be apparent from a consideration of the following description taken in connection with the accompanying drawings in which.

In practicing the invention there is provided a communication system comprising a transmitting station in which voice or other communication signals and calling signals in the audio range can be alternatively transmitted. A receiving station is provided in which the voice and calling signals are detected and which includes a selective calling system for conditioning a sound reproducing device for reproducing voice signals in response to the transmission of calling signals. Such a system requires only a single channel and either radio or wire transmission may be used. The selective calling system includes a signal responsive device having an electromechanical contactor adapted to respond to a signal of a particular frequency and means for supplying energy to the device when a tone of a particular frequency is received. Simultaneous actuation of the contactor and application of energy to the selective responsive device is required for actuation of the calling system. The energizing tone may be used as a carrier for the signal which actuates the contactor, the signal later being separated by a detector or discriminator depending upon the type of modulation used. This arrangement is particularly applicable for use in frequency modulated radio communication equipment employing a phase modulator-equalizer system of modulation as calling signals may be used which are of low frequencies and would otherwise be inadequate to provide sufficient deviation for efficient transmission.

Figure 1:
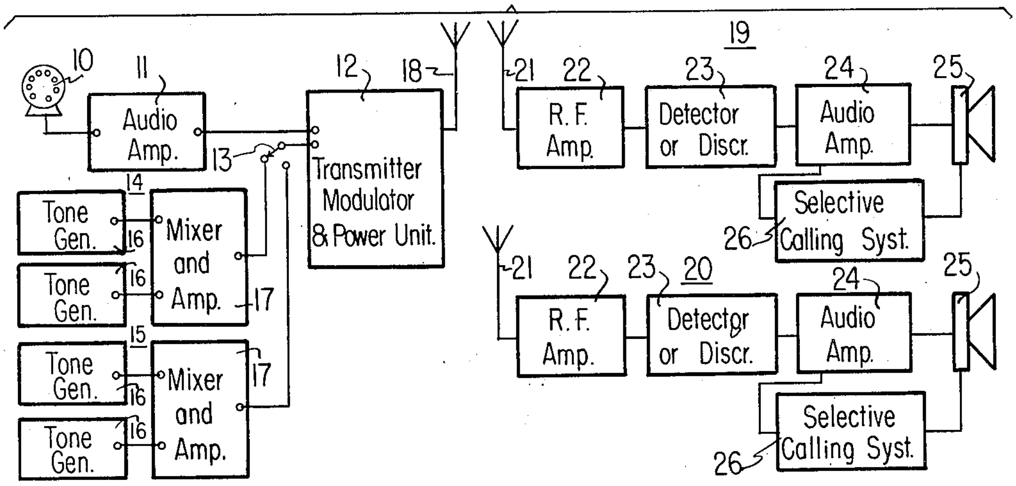
Fig. 1 is a block diagram illustrating a radio communication network utilizing the selective calling system in accordance with this invention.

Referring now to the drawings there is illustrated in Fig. 1 a radio communication network including a microphone 10, audio amplifier 11, and a transmitter modulator and power amplifier 12. A switch 13 is provided for selectively connecting one of a plurality of calling signal generators 14 and 15 to the transmitter. Each of the calling signal generators includes two or more tone generators 16 and a mixer and amplifier 17 for combining the tones prior to application to the transmitter modulator and power amplifier 12. The mixer may be either a simple transformer for combining the signals from the tone generators or may be a modulator for modulating one of the tones with the other tones as will be described. An antenna 18 is provided for radiating the signals from the transmitter 12.

The communication network may include a plurality of receivers, two receivers 19 and 20 being illustrated in Fig. 1. Each of these receivers includes an antenna 21, radio frequency amplifier 22, detector or discriminator 23, audio amplifier 24 and sound reproducing device 25. A selective calling system 26 is provided for selectively connecting the sound reproducing device to the audio amplifier. The various receivers in the network may be identical except that the selective calling system of each receiver will be arranged to respond to a particular calling signal as produced by one of the calling signal generators 14 or 15. The various items of equipment illustrated in Fig. 1 are well known and may be of any suitable construction, the invention being directed specifically to the selective calling system 26 shown in this network.

Figure 2:
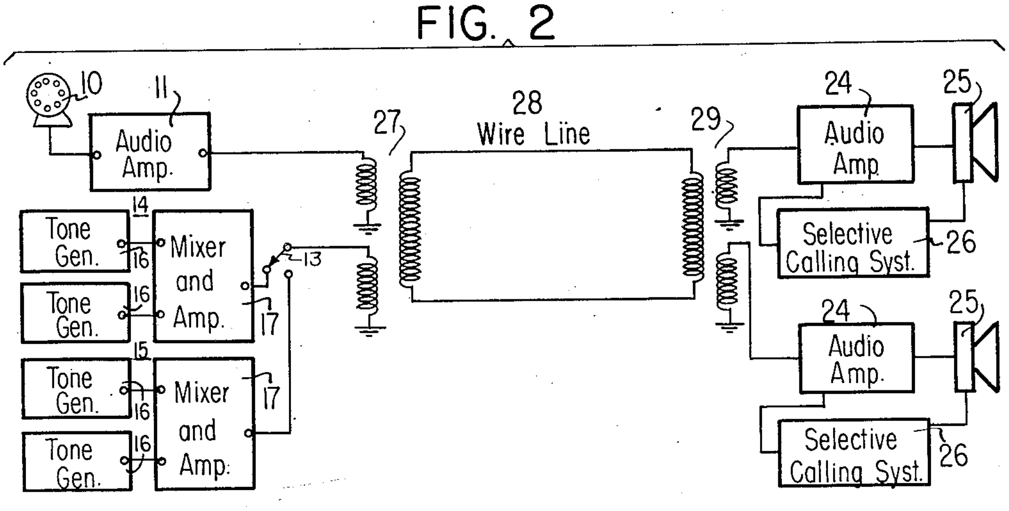
Fig. 2 is a similar network utilizing wire lines.

The communication system utilizing the selective calling system in accordance with the invention in a wire system is illustrated in Fig. 2. The system is generally similar to that of Fig. 1 and corresponding parts are designated by the same reference characters. A microphone 10 is connected through an audio amplifier 11 to a primary winding to transformer 27. Calling signal generators 14 and 15 may be selectively connected through switch 13 to a second primary winding of the transformer 27. The transformer 27 includes a secondary winding which is connected through wire line 28 to transformer 29. The transformer 29 has a plurality of secondary windings connected to audio amplifiers 24 which are in turn connected to sound reproducing devices 25 and selective calling systems 26. This network is merely illustrative and various other arrangements for use with wire lines can be used. Also the wire line need not be a simple two-wire line as shown but can be any wire channel capable of carrying signals in the audio range.

Figure 3:
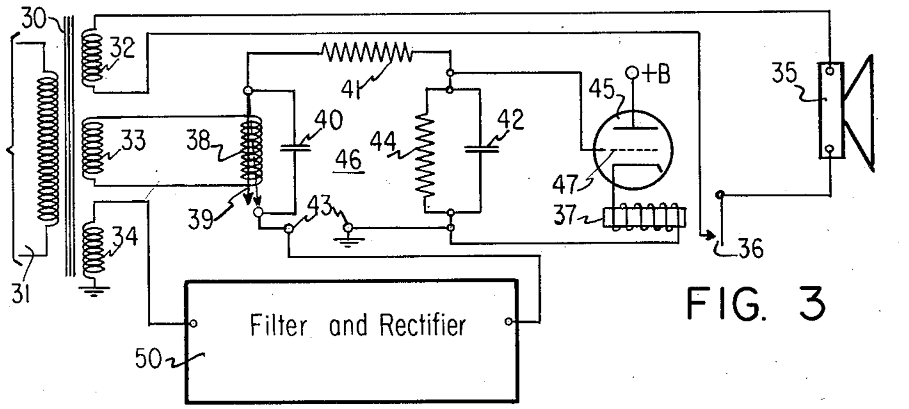
Fig. 3 is a circuit diagram of one embodiment of the selective calling system in accordance with the invention.

In Fig. 3 there is illustrated the detailed circuit of a selective calling system in accordance with the invention which may be used in the communication systems illustrated in Figs. 1 and 2. The transformer 30 is adapted to be connected to any signal source which includes calling signals and also communication signals and may be, for example, the output transformer of an audio amplifier of a radio receiver as illustrated at 24 in Fig. 1. The transformer 30 includes a primary winding 31 for connection to the signal source and three secondary windings 32, 33 and 34. The secondary winding 32 is connected to a sound reproducing device 35 through the contacts 36 of a relay 37, the secondary winding 33 is connected to the winding 38 of contactor 39 of the selective responsive device 46 and the winding 34 is connected to a filter and rectifier unit 50. The signal is therefore independently applied to each of these components.

The selective responsive device 46 includes in addition to the contactor 39 and relay 37 a charging circuit energized by the unit 50 and an electron discharge valve 45 which controls the operation of the relay. The contactor may be any electromechanical device which will cause a circuit to be closed when a signal of a particular frequency is applied thereto. For example, vibrating reeds are commercially available having contacts thereon which establish momentary electrical connection with the stationary contact points during the course of vibration of the reed. Coils are provided to produce a magnetic field about the reed which fluctuates in accordance with the frequency of the signal applied thereto, the reed responding only when the signal applied to the coil is the same as the natural frequency of the reed. The electromechanical contactor 39 is bridged by condenser 40 and connected in series with a resistor 41, condenser 42 and terminals 43 which are adapted to have a voltage impressed thereacross. A resistor 44 is connected in parallel to the condenser 42 serving to dissipate any energy stored in the condenser to thereby discharge the same. The contactor 39 will be normally open but will be intermittently closed when the proper frequency is applied to the winding 38. It is apparent that closing the contactor 39 causes the condenser 42 to be connected in series with resistor 41 across the voltage source supplied through terminals 43 to thereby charge the condenser. The intermittent closing of contactor 39 will cause increments of charge to be built upon condenser 42 until the voltage across the condenser approaches that of the voltage source. This voltage is applied to the grid 44 of electron discharge valve 45 which is illustrated as a triode. When the voltage on the grid 44 reaches a certain point the current in the output circuit of the tube 45 will increase in the normal manner until sufficient current flows through the winding 37 to actuate the relay causing the contacts 36 thereof to close to connect the loud speaker.

As previously stated, the winding 34 is connected to a filter and rectifier unit 50 which is adapted to apply a voltage across the terminals 43 of the selective responsive device when a tone of a particularly frequency is received from the signal source. The filter and rectifier unit 50 can be of any suitable construction, examples of units which are satisfactory being illustrated in Figs. 7 and 8. It is seen from the above that the relay 37 will be operated to connect the sound reproducing device only when the signal source includes a signal of the proper frequency to actuate contactor 39 and a tone of the frequency to which the filter of the unit 50 is tuned to provide energy for application to the selective responsive device. In circuits actually constructed, electromechanical contactors were used which are responsive to frequencies in the range of 200 to 400 cycles and the filter in the unit 50 was tuned to select tones in a frequency of around 3000 cycles. As the two calling frequencies must be simultaneously received by the selective calling system before operation of the system, the likelihood of accidental actuation of the system by noise or voice signals intended for other stations is very unlikely. By use of contactors having different frequencies and by tuning the filters to different frequencies it is apparent that the system can be made to respond to a great number of calls. For example, satisfactory operation was obtained when using reeds responsive to ten different frequencies for the contactors and by providing filters tuned to ten different tone signals. As the reed frequencies and tone signals are in different frequency bands, the use of ten frequencies in each band permits one hundred different combinations of these signals or one hundred different calls for the selective calling system.

Figure 4:
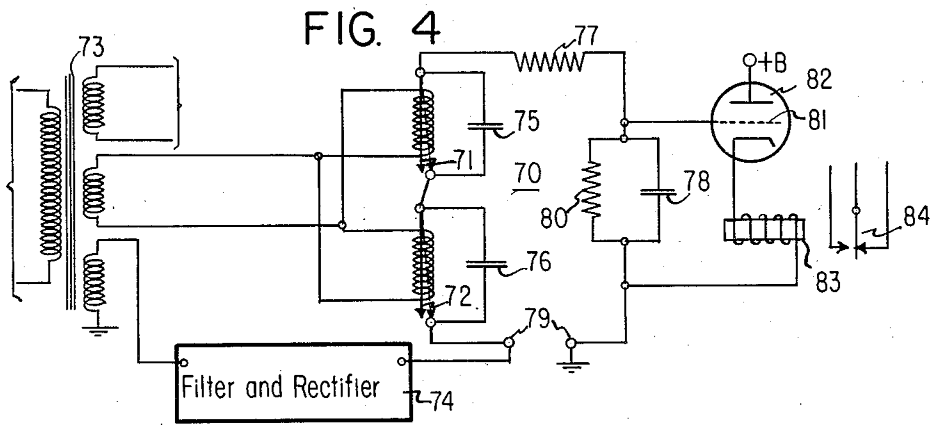
Fig. 4 is a circuit diagram of a modified system capable of handling a large number of different calls.

Fig. 4 illustrates a system generally similar to that of Fig. 3 but made more selective by the provision of a selective responsive device 70 including a pair of electromechanical contactors 71 and 72. The transformer 73 may be identical in all respects to the transformer 30 of Figs. 3 and the filter and rectifier unit 74 may be identical to the unit 50 of Fig. 3. The contactors 71 and 72 are bridged by condensers 75 and 76, respectively, and are connected in series with resistor 77 and condenser 78 for charging the condenser 78 from the voltage applied to terminal 79 by the unit 74. A resistor 80 is bridged across the condenser 78 to tend to discharge the same in the same manner as described with respect to Fig. 3. By providing contactors 71 and 72 which are responsive to different frequencies and by applying signals including these frequencies to the windings of the contactors, it is apparent that the intermittent and alternate action of the contactors will result. The contactors will be simultaneously closed only occasionally, the frequency being equal to the beat frequency between the two frequencies to which the contactors are responsive.

The selective responsive device 70 is in accordance with the copending application of Ralph J. Lense and Alfred S. Holzinger, Serial No. 749,952, filed May 23, 1947, and accordingly will not be described in detail. However, a general description of the operation of this device follows. When the contactor 71 is closed and contactor 72 is open, the condensers 76 and 78 will become charged by the voltage across terminal 79. Now when the contactor 72 is closed and contactor 71 is open, the condenser 76 is shorted to thereby remove the charge from this condenser and condensers 75 and 78 are connected across the voltage provided by the unit 74. The selective responsive device 70 will, of course, only operate when a voltage is applied thereto by unit 74 and this depends upon application of a particular tone thereto from the transformer 73 in the same manner as described with reference to rectifier 50. Continuous action in this manner will cause increasing increments of charge to be produced on condenser 78 until the voltage across this condenser approaches the voltage across terminals 79. This voltage is applied to the grid 81 of triode 82 and when this voltage reaches a predetermined value sufficient output current will flow in the tube to actuate the relay 83 causing the contacts 84 thereof to be operated in a predetermined manner. It is obvious that these contacts can be used in the manner illustrated in Fig. 3 to connect a sound reproducing device to one of the secondary windings of the transformer 73.

From the above description, it can be clearly seen that for operation of the relay 83 the incoming signal must include the frequencies required to actuate contactors 71 and 72 as well as the tone to which the filter of the unit 74 is tuned in order to provide a voltage for the selective responsive device 70. Although the calling signals are transmitted over the same channel as voice communications, it is apparent that the likelihood that the voice signals will include the three frequencies required for actuating the device 70 is very remote. Similarly the chance of noise including these frequencies is very remote. It is pointed out here that occasional voice or noise signal of the frequency to which the filter is responsive may be present and random signals of the frequencies required for operation of the contactors 72 may also be present without causing operation of the selective calling system. Although such random signals will charge the condenser 78 somewhat, the resistor 80 is at all times tending to discharge the condenser 78 and thereby prevents a charge accumulating thereon due to charge increments received over a relatively long time interval. The requirement for three separate signals for actuating the selective responsive device also increases the number of distinct calls which can be used for the system. The use of contactors available in ten different frequencies and being used two at a time as illustrated in Fig. 3, combined with ten different energizing tones provides a total of 450 different calls. This system, therefore, is applicable to a communications network having a large number of stations.

It is obvious that the general system illustrated in Fig. 1 is adaptable to a system using either amplitude, angular, or pulse modulation, the calling signals being within the audio frequency range and being transmitted over this same channel with the voice signals. However, as the signals to which the reeds are responsive are of relatively low frequency, these frequencies would not provide sufficient deviation of the carrier for efficient transmission in the case of a frequency modulated transmitter employing a phase modulator and equalized. This defect can be overcome by modulating the tone frequency which is in the vicinity of 3000 cycles with the signal or signals for actuating the contactors to thereby provide sufficient energy for driving the modulator. Referring to Fig. 1 the mixer would be a modulator for modulating the frequency from one of the tone generators (the higher frequency) by the frequency of the other tone generator.

Figure 5:
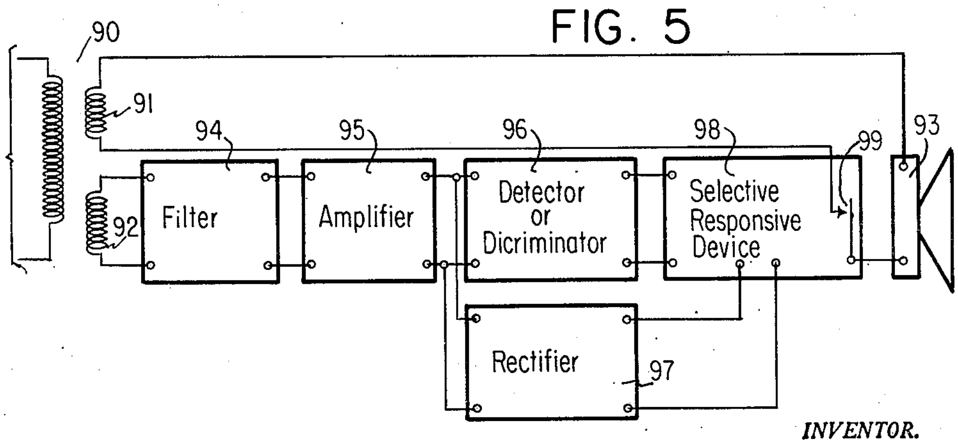
Fig. 5 is a block diagram illustrating a selective calling system operable by two tones one of which serves as a carrier for the other.

Fig. 5 illustrates a selective calling system adapted to respond to a composite signal including a tone in the audio frequency range which serves as a carrier and is modulated by one or more signals of lower frequency. The transformer 90 may be connected to any signal source such as the output transformer of the audio amplifier 24 of Fig. 1 and includes a pair of secondary windings 91 and 92. The winding 91 is connected to a signal reproducing device 93 and the winding 92 is connected to a selective calling system. The selective calling system includes a band pass filter 94 adapted to pass the carrier tone and the side bands which include the signals for actuating the reeds. The tone used as a carrier may be used for supplying the energy for the system and a plurality of systems can be selectively energized by providing tones of different frequencies sufficiently separated so that a filter such as a standard reactance type filter will eliminate all of the tones (carriers) except the one which it was intended to pass. The composite signal is then amplified by amplifier 95 and applied to detector 96 and rectifier 97. The modulating signals are derived by the detector 96 and applied to the signal responsive device 98. The rectifier 97 can be any suitable rectifier and should include a filter for smoothing the output before application to the selective responsive device 98.

The system of Fig. 5 may be used with either an amplitude modulated system or an angular modulated system. The unit 96 will be either an amplitude modulation detector or a discriminator for angular modulation depending upon the type of modulation used in the transmitter. If a frequency modulation system is used the filter 94 may be provided between the amplifier 95 and the rectifier 97 as the discriminator will be sensitive only to a particular carrier frequency and elimination of other frequencies is not required. By placing the filter 94 in this position the band which the filter must pass may be narrowed as the filter will only need to pass the carrier and will not need to pass the side bands which include the signals for actuating the selective responsive device 98.

The selective responsive device of Fig. 5 may be of the type shown at 46 in Fig. 3 which is responsive to a single calling signal or the type shown at 70 in Fig. 4 which requires two separate signals for actuating the same. As previously stated, by using a single contactor as illustrated by the selective responsive device in Fig. 3 it is possible to use 100 different calls and by using two different reeds as in the system of Fig. 4, it is possible to obtain 450 different calls. The selective responsive device includes contacts 99 for connecting the sound reproducing device 93 to the secondary winding 91 in the manner previously described.

Figures 6, 7:
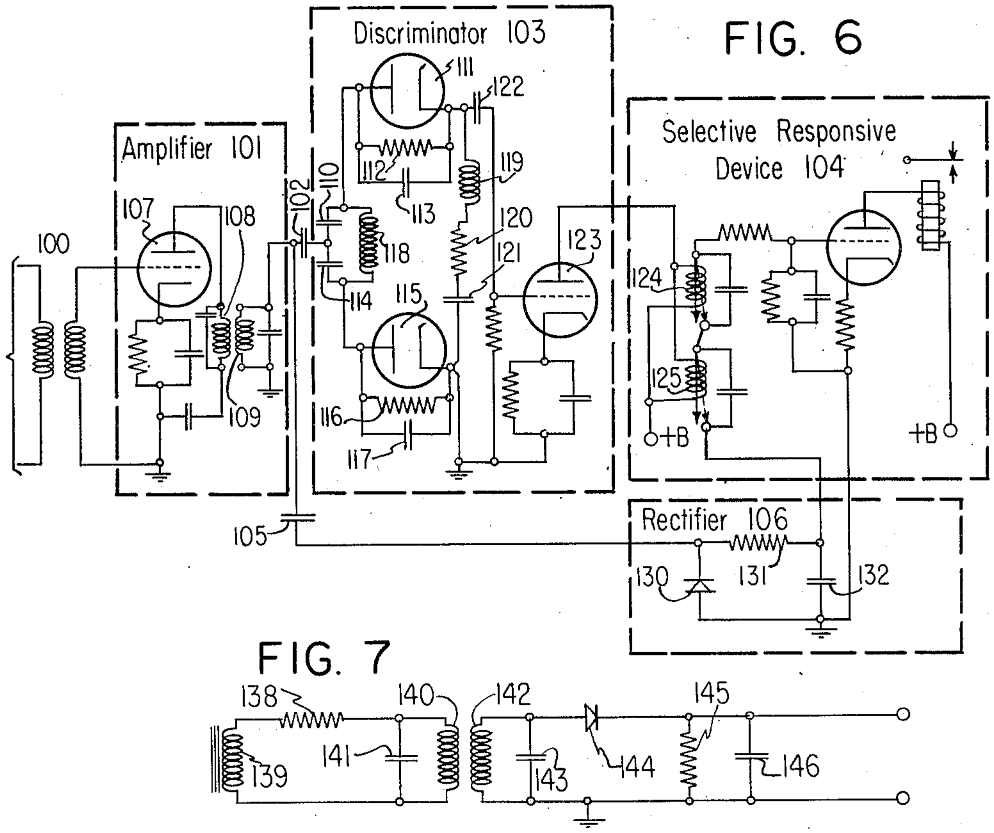
Fig. 6 is a circuit diagram of a frequency modulated system.
Figs. 7 and 8 illustrate various filter rectifier units adapted for use in the systems of Figs. 3, 4, 5 and 6.

In Fig. 6 there is illustrated the detailed circuit of a selective calling system of the type generally shown in Fig. 5 which is adapted to be operated by a tone frequency modulated by two signal frequencies. In Fig. 6 the transformer 100 may be connected to any signal source such as the audio output of a radio receiver. The composite signal is fed from the transformer to a buffer amplifier 101 which selects the desired energizing tone, increases the signal strength thereof, and prevents loading of the line. The amplified and selected signal is applied through blocking condenser 102 to discriminator 103 wherein the modulating frequencies are derived from the composite signal. Although various types of discriminators can be used the circuit illustrated utilizes a discriminator which is generally of the type disclosed in Patent No. 2,404,359. The signal frequencies are separated from the tone carrier by the discriminator 103 and applied to signal responsive device 104 which is of identical construction to the signal responsive device 70 of Fig. 3. The signal from the amplifier 101 is also applied through condenser 105 to a rectifier unit 106 which provides a direct current voltage for operation of the selective responsive device 104.

The amplifier 101 includes a triode vacuum tube 107 and an output circuit 108 which is tuned to the frequency of the energizing tone. This output circuit is coupled to a second tuned circuit 109 which is connected through condensers 102 and 105 to the discriminator 103 and the rectifier 106 respectively. The double tuned circuit 108 and 109 must provide sufficient band width to pass the energizing tone which functions as a carrier, as well as the side bands which contain the tones for actuating the reeds of the selective responsive device 104 as will be described in detail.

Referring now more particularly to the operation of discriminator 103, the signal is applied from the amplifier to a pair of rectifiying paths, one including condenser 110 and rectifier 111 which is bridged by resistor 112 and condenser 113 and the second including condenser 114 and rectifier 115 which is bridged by resistor 116 and condenser 117. An inductor 118 is bridged across the condensers 110 and 114 to tune the input circuit approximately to the frequency of the tone to be received. The condensers 113 and 114 are of slightly different value to unbalance the two bridges of the discriminator as fully described in the patent referred to above. Inductor 119 and condenser 121 are of such values to be series resonant at the energizing tone frequency. Resistor 120 lowers the Q of the series resonant circuit, thus providing the necessary by-pass band-width. Owing to the presence of the two above mentioned circuits, the discriminator operates only on the particular carrier signal to which it is tuned and rejects all others. As is well known, the discriminator is not affected by amplitude variations in the tone and, therefore, interference in the form of amplitude variations will be rejected and will not be applied to the selective responsive device. The modulating signals are derived from the tone by the discriminator and are applied through blocking condenser 122 to a power amplifier tube 123 after which they are applied to the windings of the contactors 124 and 125 of the selective responsive device 104. The detailed circuit of the selective responsive device 104 will not be described as this is identical to the selective responsive device 70 of Fig. 4 previously described.

The rectifier unit 106 includes a rectifier 130 and an integrator circuit comprising a resistor 131 and a condenser 132 for smoothing the rectifier output and providing a steady voltage for the selective responsive device. As the amplifier 101 is selective, the rectifier 106 will cause energization of the selective responsive device 104 only when a particular tone is received. As previously stated, the discriminator 103 will not provide output signals for the contactors unless the particular tone to which the discriminator is tuned is received as a carrier, and further the contactors will not be actuated unless signals of the particular frequencies to which the contactors respond are applied thereto from the discriminator. The selective energization of the selective responsive device adds further selectivity to the system. Therefore, it is obvious that the selective calling system is highly selective and would not be actuated by noise signals or voice signals which were applied thereto.

As the discriminator 103 is effective to apply the tone signals to the reeds only when the particular carrier to which it is tuned is received thereby, the discriminator is in itself selective to the energizing tone frequency. Therefore, satisfactory operation may be obtained without the use of a rectifier which is effective to energize the selective responsive device only when a particular energizing tone is applied thereto. Therefore, the rectifier 106 may be replaced by any suitable source of direct current and satisfactory operation of the system will still be obtained. It is to be pointed out, however, that added selectivity is obtained by providing the rectifier as shown in Fig. 6 for selectively energizing the selective responsive device.

Figure 8:
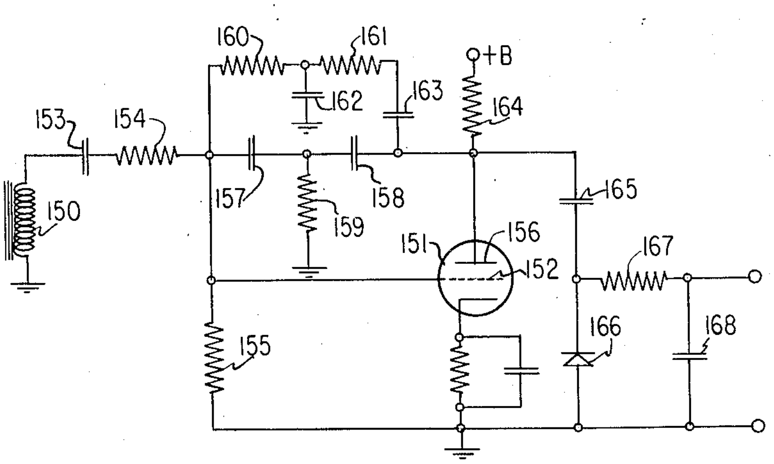

As previously stated, examples of filter and rectifier units suitable for use in the systems of Figs. 3 and 4 are shown in Figs. 7 and 8. Fig. 7 illustrates a simple tuned filter including a primary winding 140 tuned by condenser 141 and connected in parallel therewith across the winding 139. Resistor 138 is provided to prevent detuning of the circuit. The winding 139 provides audio and calling signals and may be connected in a system as the winding 34 of Fig. 3. The primary winding 140 is inductively coupled to a secondary winding 142 which is tuned by condenser 143. The output of the filter is applied to a rectifier 144 which provides a direct current which is smoothed out by a filter comprising resistor 145 and condenser 146. This output is suitable for energizing a selective responsive device such as 46 of Fig. 3 and may be applied to the terminals 43 thereof.

In Fig. 8 there is disclosed a selective amplifier which selects and amplifies the energizing tone and then applies it to a rectifier which provides direct current for the selective responsive device. The amplifier is connected to a source of signals which may be a winding 150 corresponding to the secondary winding 34 in Fig. 3. The amplifier includes a triode 151 and a filter which is tuned so that it passes a tone of a particular frequency only. The triode includes a grid 152 which is connected to the winding 150 by blocking condenser 153 and a series resistor 154 and is biased by resistor 155. The filter is connected both to the grid 152 and the plate 156 of the triode and includes a high pass branch including series condensers 157 and 158 and shunt resistor 159 and a low pass branch including series resistors 160 and 161 and shunt condenser 162. A blocking condenser 163 is provided in series with the resistors 160 and 161 to prevent application of signals from the winding 150 to the plate 156 of the triode. It is pointed out that other well known types of filters can be used, the particular filter illustrated being merely by way of example. The plate 156 of the triode is connected through resistor 164 to a source of +B voltage and through blocking condenser 165 to rectifier 166. The rectifier 166 is connected through an integrator network comprising resistor 167 and condenser 168 which provides a direct current voltage which is substantially free of fluctuations. This voltage may be used to energize a selective responsive device and, for example, may be applied to terminals 43 in Fig. 3 or terminals 79 in Fig. 4.

The various selective responsive systems disclosed above may be provided by relatively simple and inexpensive components and the resulting equipment is rugged and comparatively small as is required for mobile use. Equipment in accordance with the invention has been found to be very reliable and highly selective in use. The simultaneous occurrence of an energizing tone of one frequency and one or more tones of lower frequencies for energizing reeds as required for operation of the calling system will seldom be present in noise, voice or music signals to cause unintentional actuation of the calling system. Also, the arrangement wherein the relatively low frequency reed signals are used to modulate the higher frequency tone signals makes a system which is particularly suitable for use in frequency modulated systems.

Although certain preferred embodiments of my invention have been described herein, it is apparent that various changes and modifications can be made therein without departing from the intended scope of the invention as defined in the appended claims.

I claim:

1. A selective control system including in combination, first frequency selective means responsive to a first signal of a first frequency, said first frequency selective means including means producing a direct current output voltage in response to the application of said first signal thereto, second frequency selective means including means providing an intermittently conducting path in response to the application thereto of a second signal including at least one different frequency, means for simultaneously applying signals to said first and second frequency selective means, condenser means, and circuit means including said second frequency selective means for connecting said condenser means to said first frequency selective means for charging said condenser means from said direct current output voltage through said intermittently conducting path, said circuit means providing charging current for said condenser means only in response to the simultaneous application to said system of said first and second signals.

2. A selective control system in accordance with claim 1, in which said first frequency selective means includes filter means for selecting said first signal and rectifier means connected to said filter means for producing a direct current voltage from said first signal, and said second frequency selective means includes a vibratory reed having a natural frequency the same as said different frequency of said second signal, means for exciting said reed by said second signal, and contact means on said reed which are intermittently closed as said reed vibrates.

3. A selective control system in accordance with claim 1, in which said first frequency selective means includes filter means for selecting said first signal and rectifier means connected to said filter means for producing a direct current voltage from said first signal, and said second frequency selective means includes a pair of vibratory reeds having natural frequencies the same as two frequencies of said second signal which are different from said first frequency, means for exciting said reeds by said second signal, contact means on said reeds which are intermittently closed as said reeds vibrate, and means connecting said contact means in series.

4. A selective control system including in combination, electromechanical means including contact means which are closed in response to a signal of a first frequency, frequency selective means for passing a signal of a second frequency only, means for simultaneously applying signals to said electromechanical means and said frequency selective means, rectifier means, condenser means, circuit means connecting said rectifier means to said frequency selective means so that said rectifier means produces a direct current output voltage in response to the application of a signal of said second frequency to said frequency selective means, and second circuit means including said contact means of said electromechanical means for selectively connecting said condenser means to said rectifier means in response to the application of a signal of said first frequency to said electromechanical means, for charging said condenser means from said direct current voltage produced by said rectifier means through said contact means of said electromechanical means, whereby said condenser means is substantially charged to produce a control voltage only in response to the simultaneous application to said system of signals of said first and second frequencies.

5. A selective control system in accordance with claim 4, in which said electromechanical means is responsive to a signal of a relatively low frequency and said frequency selective means is responsive to a signal of a relatively high frequency.

6. A selective control system including in combination, a first and second electromechanical means individually responsive to signals of first and second frequencies, frequency selective means for passing a signal of a third frequency only, means for simultaneously applying signals to said electromechanical means and said frequency selective means, rectifier means, condenser means, circuit means connecting said rectifier means to said ferquency selective means so that said rectifier means produces a direct current output voltage in response to the application of a signal of said second frequency to said frequency selective means, each of said electromechanical means including means rendered conducting when a signal to which the particular means is responsive is applied thereto and second circuit means including said first and second electromechanical means for selectively connecting said condenser means to said rectifier means in response to the application of signals of said first and second frequencies to said electromechanical means, for charging said condenser means from said direct current voltage produced by said rectifier means, whereby said condenser means is charged to produce a predetermined control voltage only in response to the simultaneous application to said system of signals of said first and second frequencies for a predetermined time interval.

7. A selective system responsive to a composite signal including a first signal of a first frequency which is modulated by a second signal including a second frequency differing from said first frequency, said system including in combination, first frequency selective means including means producing a direct current output voltage in response to the application of a signal of said first frequency thereto, detector means for deriving the modulating signal from a modulated signal, second frequency selective means including means providing an intermittently conducting path in response to the application thereto of a signal including said second frequency, means connecting said detector means to said second frequency selective means for applying the derived modulating signal thereto, condenser means, and circuit means including said second frequency selective means for connecting said condenser means to said first frequency selective means for charging said condenser means from said direct current output voltage through said intermittently conducting path, said circuit means providing charging current for said condenser means only in response to the application to said system of a composite signal simultaneously including said first signal modulated by said second signal.

8. A selective system in accordance with claim 7, in which said first frequency selective means includes filter means which passes only a signal of a first relatively high frequency and rectifier means for producing a direct current from the signal passed by said filter, and said second frequency selective means includes electromechanical means having contacts which intermittently close in response to the application thereto of a second relatively low frequency.

9. A selective system responsive to a composite signal including a first signal of a first frequency which is frequency modulated by a second signal including two other frequencies, said system including in combination, first frequency selective means responsive to said first frequency for passing said first signal, rectifier means connected to said first frequency selective means for producing a direct current output voltage from the signal passed thereby, detector means connected to said first frequency selective means for deriving the modulating signal from a modulated signal applied thereto, second frequency selective means connected to said detector including a pair of electromechanical contactors each providing an intermittently conducting path in response to the application thereto of one of said other frequencies, condenser means, and circuit means connecting said condenser means and said electromechanical contactors in series to said rectifier means for charging said condenser means from said direct current output voltage of said rectifier means through said intermittently conducting paths of said electromechanical contactors, said circuit means providing charging current for said condenser means only in response to the application to said system of a composite signal including a first signal of said first frequency which is frequency modulated by a second signal including said two other frequencies.

DANIEL E. NOBLE.

REFERENCES CITED

The following references are of record in the file of this patent:

UNITED STATES PATENTS

| Number | Name | Date |
|---|---|---|
| 1,677,224 | Affel | July 17, 1928 |
| 1,777,355 | Fetter | Oct. 7, 1930 |
| 1,863,829 | Bruckel | June 21, 1932 |
| 1,941,067 | Armstrong | Dec. 26, 1933 |
| 1,988,614 | Tuczek | Jan. 22, 1935 |
| 2,194,935 | Getaz | Mar. 26, 1940 |
| 2,245,652 | Dickert | June 17, 1941 |
| 2,250,596 | Mountjoy | July 19, 1941 |
| 2,255,162 | Hart | Sept. 9, 1941 |
| 2,316,902 | Trevor | Apr. 20, 1943 |
| 2,321,651 | Caraway | June 15, 1943 |
| 2,369,230 | Hansell | Feb. 13, 1945 |
| 2,383,908 | Bowers | Aug. 28, 1945 |
| 2,392,672 | Koch | Jan. 8, 1946 |
| 2,397,088 | Clay | Mar. 26, 1946 |
| 2,431,167 | Byrnes | Nov. 18, 1947 |
| 2,457,149 | Herbst | Dec. 28, 1948 |
| 2,480,115 | Brown et al. | Aug. 30, 1949 |
| 2,523,315 | Mayle | Sept. 26, 1950 |
| 2,524,782 | Ferrar et al. | Oct. 10, 1950 |
| 2,527,561 | Mayle | Oct. 31, 1950 |